United States Patent [19]

Jurich

[11] Patent Number: 4,807,434
[45] Date of Patent: Feb. 28, 1989

[54] THRUST REVERSER FOR HIGH BYPASS JET ENGINES

[75] Inventor: Umberto Jurich, Kirkland, Wash.

[73] Assignee: The Boeing Company, Seattle, Wash.

[21] Appl. No.: 135,703

[22] Filed: Dec. 21, 1987

[51] Int. Cl.$^4$ ................................................ F02K 3/04
[52] U.S. Cl. ........................... 60/226.2; 239/265.31; 239/265.29
[58] Field of Search ................... 60/226.2, 229, 230; 239/265.31, 265.29, 265.27, 265.37

[56] References Cited

U.S. PATENT DOCUMENTS

| | | | |
|---|---|---|---|
| 3,262,271 | 7/1966 | Beavers | 60/226.2 |
| 3,493,178 | 2/1970 | Bruner | 239/265.31 |
| 3,500,645 | 3/1970 | Hom | 60/226.2 |
| 3,503,211 | 3/1970 | Medawar et al. | 239/265.31 |
| 4,145,877 | 3/1979 | Montgomery | 60/226.2 |
| 4,391,409 | 7/1983 | Scholz | 60/226.2 |
| 4,731,991 | 3/1988 | Newton | 60/226.2 |

FOREIGN PATENT DOCUMENTS

| | | | |
|---|---|---|---|
| 109219 | 5/1984 | European Pat. Off. | 60/226.2 |
| 2379705 | 10/1978 | France | 239/265.31 |
| 8401344 | 4/1984 | PCT Int'l Appl. | 60/226.2 |
| 2156004 | 10/1985 | United Kingdom | 60/229 |

Primary Examiner—Donald E. Stout
Attorney, Agent, or Firm—Christensen, O'Connor, Johnson & Kindness

[57] ABSTRACT

A thrust reverser able to accommodate the convergent shape of the nacelle used on an ultrahigh bypass fan engine. The thrust reverser includes a plurality of tapered cascaded vane sections (84/132) that are connected to an aft edge of an annular ring (82), which is disposed at the rear of a fixed portion of a nacelle (66) surrounding an engine core (62). An aft portion (70) of the nacelle includes a plurality of pockets (96/152) in which the cascaded vane sections are stowed during operation of the engine in a forward thrust mode. Linear actuators (98) translate the aft portion rearwardly, exposing the cascaded vane sections and deploying a plurality of blocker panels (94/136), for operation of the engine in a reverse thrust mode. In a first embodiment, the cascaded vane sections (84) are pivotally connected to the annular ring and the blocker panels are connected with telescoping links (104) to the annular ring. In a second embodiment, the cascaded vane sections (132) are fixed to the annular ring, and the blocker panels are pivotally connected by a fixed length link (138) to the outer surface of the engine core.

20 Claims, 8 Drawing Sheets

THRUST REVERSER FOR HIGH BYPASS JET ENGINES

FIELD OF TECHNOLOGY

This invention generally pertains to a thrust reverser for a jet engine and, more specifically, to a thrust reverser for an ultrahigh bypass engine.

BACKGROUND OF THE INVENTION

A bypass type turbofan jet engine typically includes a nacelle or cowling surrounding a jet engine core and defining a flow-through duct for prop driven airflow. The airflow through this duct follows the contour of the engine from front to rear, providing forward thrust for the aircraft. When reverse thrust is required to slow the aircraft during landing or while cruising, a thrust reverser is deployed at the rear of the cowling, deflecting the airflow through a ring of turning vanes, which are exposed as an aft section of the cowling is moved toward the rear of the engine. The turning vanes redirect the airflow radially outward and back toward the front of the engine, producing the required reverse thrust.

In an ultrahigh bypass engine, the engine core has a relatively large diameter and the nacelle surrounding the engine must have a much larger diameter than the nacelle used in a conventional bypass engine. In addition, compared to the nacelles on conventional bypass turbofan engines, the nacelles used on ultrahigh bypass engines have a more conical shape, converging radially inward at their trailing edge to a greater extent. Their shape makes it difficult to adapt the prior art thrust reversers for use with such engines without increasing the thickness of the portion of the cowling in which the turning vanes are recessed. Becaue it is housed in the aft portion of the cowling, the turning vane ring used in prior art designs would have to have substantially the same convergent shape as the nacelle aft end. Additional cross-sectional thickness in the cowling would be needed so that the rear portion of the nacelle could clear the converging aft end of the turning vane ring during its deployment. A thrust reverser of the prior art design would thus be excessively heavy if scaled-up for use on an ultrahigh bypass engine, would require a longer fan cowl, and would add significant drag to the engine due to an increase in the cross-sectional area of the cowling.

Accordingly, the present invention provides a thrust reverser that has a relatively thin cross section, with minimal drag. Furthermore, this thrust reverser adds less weight to the nacelle of an ultrahigh bypass engine than would a thrust reverser of conventional design. These and other advantages of the present invention will be apparent from the attached drawings and the description of the preferred embodiments that follows below.

SUMMARY OF THE INVENTION

In accordance with the present invention, a thrust reverser is disclosed and claimed for a bypass fan jet engine having a core and an annular cowling supported concentrically about a forward portion of the core. An annular duct is defined between the cowling and the core, through which airflow is driven by a fan that extends radially beyond the circumference of the core.

The aft section of the cowling defines a nozzle for the duct, including an inner and outer surface that converge toward a trailing edge. Between the inner and outer surfaces are disposed a plurality of spaced-apart, radially extending panels defining a plurality of pockets. Each pocket is open at its forward end, its aft end extending inside the cowling, toward the cowling's trailing edge.

A plurality of linear actuators, connected between a forward fixed portion of the cowling and the aft section, are operative to move the aft section rearwardly from a position adjacent the fixed portion, (a position occupied in a forward thrust mode), to a displaced position, for operation of the engine in a reverse thrust mode. Translation of the aft section rearwardly creates an opening between the fixed and aft sections of the cowling.

Attached to the fixed portion of the cowling are a plurality of cascaded vane sections. Each of the cascaded vane sections extend into one of the pockets disposed in the aft section of the cowling while the engine is operating in the forward thrust mode. Each cascaded vane section includes a plurality of vanes, and each of the vanes is curved to deflect air flowing outwardly through the opening in a forward direction when the cascaded vane sections are exposed in the reverse thrust mode.

Disposed in spaced-apart array around the inner circumference of the aft section of the cowling are a plurality of blocker panels. The blocker panels are pivotally connected at one end to the radially extending panels in the aft section. One end of each of a plurality of links is pivotally connected to the inner surface of each blocker panel, the other end being connected to one of the fixed section of the cowl and the engine core. The links are operative to cause the blocker panels to swing inwardly across the duct as the actuators translate the aft section to its full rearward extension. In the reverse thrust mode, airflow impinges on the deployed blocker panels and is thus forced to flow outwardly through the exposed cascaded vanes.

In one embodiment, the links include a first and a second section, the first section telescopically extending relative to the second section as the actuators translate the aft section rearwardly. Upon reaching full extension, the links are operative to swing the blocker panels inwardly across the duct. One of the first and second sections of each link is pivotally attached to the blocker panel, the other section being pivotally attached to a tab disposed on the fixed portion of the cowling. The links further include spring means for biasing the first and second sections in opposition to their extension.

In another embodiment, one end of each link is pivotally connected to one of the blocker panels and the other end extends generally forward, across the duct, and is pivotally connected to a tab disposed on the outer surface of the engine core.

Both embodiments include cascaded vane sections that are substantially tapered in cross-sectional thickness. The vane sections are thus relatively thinner on their rearwardly extending end than on their forward end, so that they may fit within a similarly tapered pocket on the aft section of the cowling. The cascaded vane sections in one embodiment are each pivotally attached to the fixed portion of the cowling, pivoting outwardly as the actuators translate the aft section of the cowling toward the rear. The pivoting cascading vane sections in this embodiment also include a pivot stop, and are biased outwardly by the force of airflow in the duct until they reach the stop. Upon reaching the stop, the cascaded vane sections are cantilevered from the fixed portion of the cowling.

DESCRIPTION OF THE PREFERRED EMBODIMENTS

Figure 1:
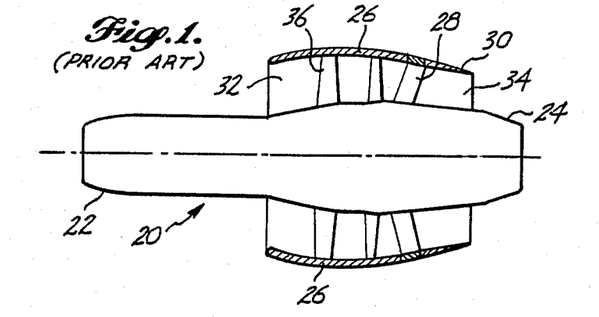
FIGS. 1 through 3 are cross-sectional profiles of ultrahigh bypass jet engines commercially available from three different manufacturers.
Figure 2:
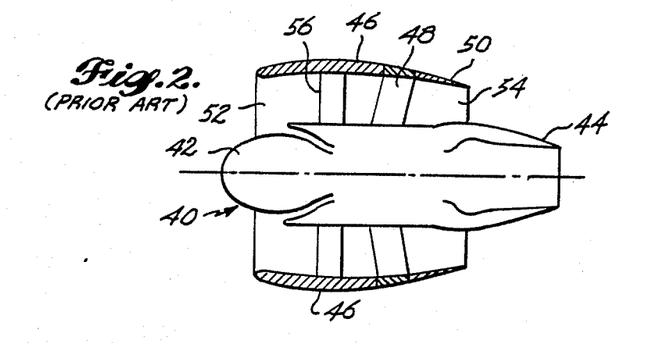
Figure 3:
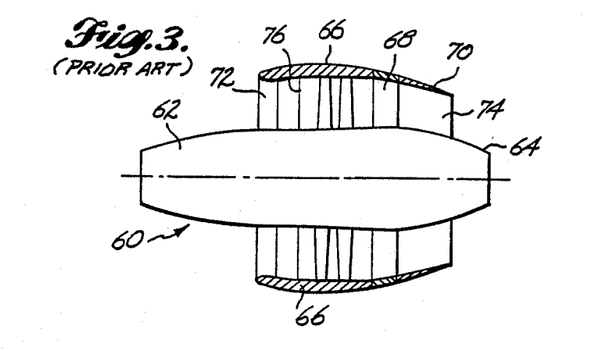

Three different designs for an ultrahigh bypass jet engine are shown in FIGS. 1 through 3 to illustrate both the differences and similarities in configuration of this type engine as supplied by different manufacturers. In FIG. 1, an ultrahigh bypass engine 20 includes a relatively long core 22 that extends well forward of a nacelle 26. The nacelle is mounted on supports 28 concentrically around the engine core. Core 22 provides thrust from the combustion of compressed fuel and air that is burned internally, exiting through the longitudinal rear portion of the core. In addition to providing the jet thrust, core 22 includes a turbine (not shown), which drives a fan 36 to produce airflow through nacelle 26. Air is drawn in through a forward opening 32 by fan 36, and is expelled through an aft opening 34, defined by a nozzle 30, which is disposed on the aft end of nacelle 26. As is generally typical of ultrahigh bypass jet engines, nozzle 30 is conical, converging radially inward at the aft end of the nacelle.

In the ultrahigh bypass jet engine 40 of FIG. 2, an engine core 42 is shown that is somewhat shorter in length than core 22 of ultrahigh bypass engine 20 (FIG. 1). A nacelle 46 is spaced-apart from the outer periphery of a core 42, supported by struts 48. Nacelle 46 defines a duct for air drawn into a forward opening 52 by rotation of fan 56. The airflow through nacelle 46 is expelled through a nozzle 54, defined by the aft end 50 of nacelle 46, augmenting the forward jet thrust of core 42.

In FIG. 3, yet another design profile for an ultrahigh bypass engine 60 is shown. Like the other two, jet engine 60 includes a core 62, which produces a jet thrust due to the expansion of burning gases exiting through the aft end of the core 64. Surrounding core 62 and spaced-apart therefrom is a nacelle 66, supported by suitable struts 68. The nacelle defines a duct around the periphery of core 62 for airflow used to augment the jet thrust of the engine. A fan 76 draws air through a forward opening 72. The airflow passes around core 62 and is expelled through a nozzle 74, defined by the aft end 70 of the nacelle. In each of the designs for the ultrahigh bypass engines shown in FIGS. 1 through 3, the nacelles are relatively large in diameter, and their aft ends converge toward the engine core, defining a relatively smaller diameter nozzle 34, 54, or 74, respectively. As previously explained, both the size and shape of the aft portion of the nacelles in each of these designs makes it impractical, if not impossible, to use prior art thrust reversers.

Figure 4:
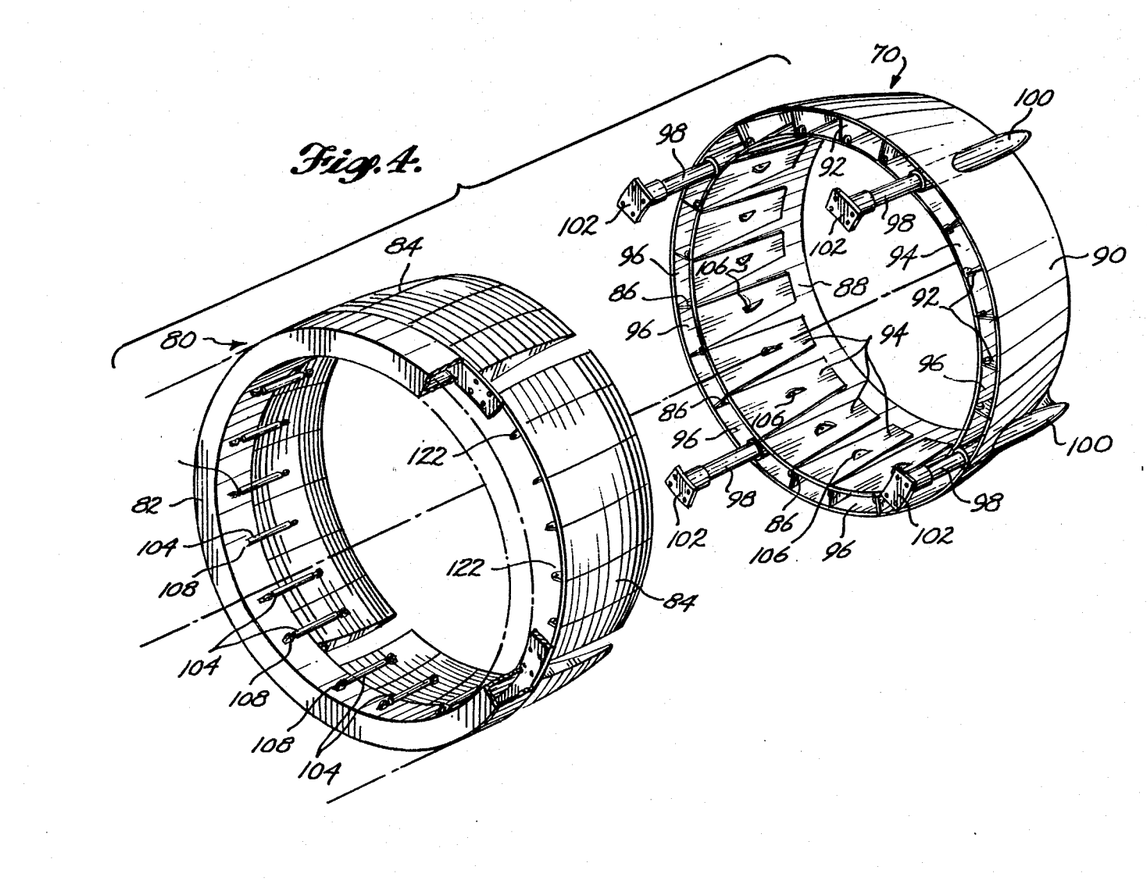
FIG. 4 is an exploded isometric view illustrating a first preferred embodiment of a thrust reverser in accordance with the present invention.

A first embodiment of the present invention is shown in an exploded view in FIG. 4, generally denoted by reference numeral 80. Although thrust reverser 80 is usable with each of the designs for an ultrahigh bypass jet engine shown in profile in FIGS. 1, 2 and 3, its use is disclosed specifically herein with respect to ultrahigh bypass engine 60 illustrated in FIG. 3, and it is incorporated into nacelle 66.

The aft portion 70 of nacelle 66 as shown in a first embodiment in FIGS. 4 through 8 is configured as an annular sleeve, including a plurality of pockets 96 defined by a plurality of panels 92 that extend radially between an exterior skin 90 (comprising a unitary honeycomb panel) and an interior surface 88. Cascaded vane sections 84 are each sized to fit corresponding pockets 96, and are pivotally attached with clevis pins 122 at their forward end to an annular ring 82. Annular ring 82 is disposed at the aft end of the fixed portion of nacelle 66.

Figure 9:
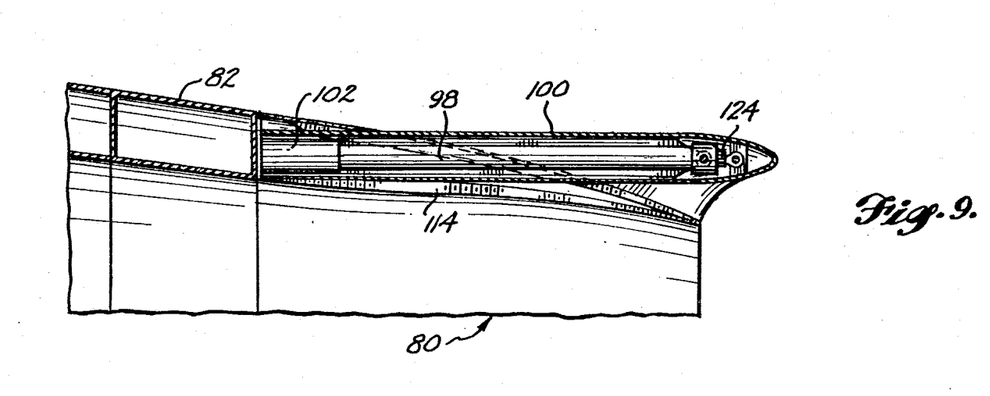
FIG. 9 is a cross-sectional view of a portion of the thrust reverser of the first embodiment, showing an actuator in the forward thrust mode.
Figure 10:
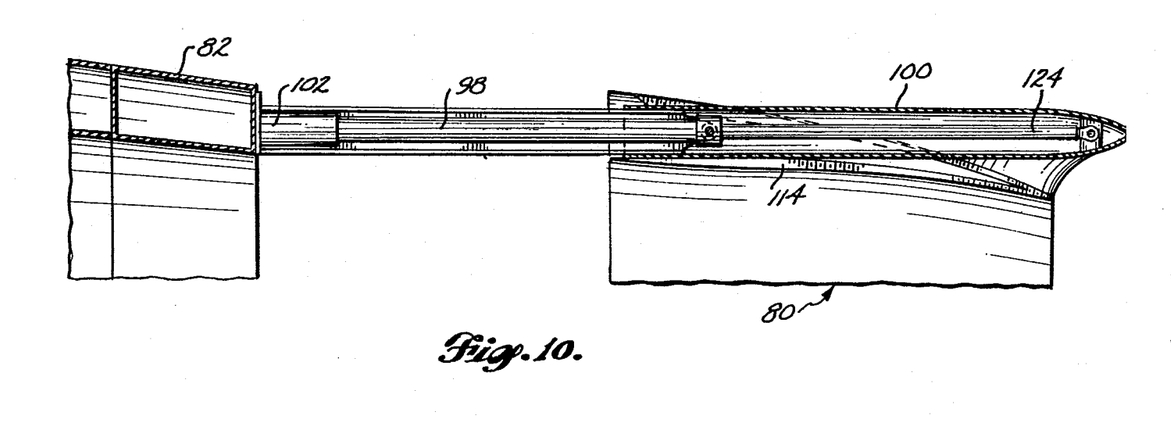
FIG. 10 shows the actuator of FIG. 9 deployed in a reverse thrust mode.

Four linear actuators 98 are disposed at spaced-apart intervals around the circumference of aft portion 70 and are fitted into actuator receivers 100, which extend longitudinally outward of the external surface of skin 90. The double acting hydraulic rams used for the linear actuators of the thrust reverser are shown in FIGS. 9 and 10. The forward end of each of the linear actuators 98 is connected to an actuator bracket 102, which is bolted or otherwise suitably connected to annular ring 82. An actuator synchronization shaft (not shown) is connected to each linear actuator, just aft of bracket 102, and is operative to insure that each of the four linear actuators deploys at the same rate, preventing any binding torque from occurring. Although their internal structure is not shown, each linear actuator 98 includes an internal shaft 124 connected to the aft portion 70 (inside receiver 100). Shaft 124 telescopically extends or retracts as hydraulic fluid is pumped into or withdrawn from the linear actuators. Linear actuators 98 are used to translate aft portion 70 rearwardly from a position in which the cascaded vane sections 84 are fully enclosed within their corresponding pockets 98 in a forward thrust mode, to a position in which the cascaded vane sections are exposed, for operation in a reverse thrust mode.

In most prior art designs for thrust reversers, the turning vane section has an almost uniform cross-sectional thickness between its forward and aft ends. In these designs, the turning vanes either extend in a continuous annular ring about the entire circumference of the nacelle, or are divided into four discrete sections mounted in a continuous annular frame, each section extending intermediate linear actuators like those used in the present invention. By comparison, each of the cascaded vane sections 84 used in the present invention are tapered in radial cross section thickness from front to rear, and are sufficiently narrow in width so that they slide between panels 92, fitting into pockets 96. When fitted into pockets 96, the cascaded vane sections of the first embodiment 80 define a conical shape, congruent with the conical shape of the aft portion 70 of the nacelle.

The inner surface 88 of aft portion 70 includes a plurality of blocker panels 94, which normally cover cascaded vane sections 84 in a forward thrust mode. At their forward end, block panels 94 include two tabs along each side that are bent at right angles to the surface of the blocker panel and which are pivotally attached to panels 92 with clevis pins 86.

A plurality of tabs 108 are disposed at spaced-apart intervals around the inner surface of annular ring 82. One end of an equal number of links 104 is pivotally connected to each tab 108 using a clevis pin 107. Links 104 comprise an outer cylinder 115 and an internal shaft 116. Shaft 116 of each link is pivotally connected with a clevis pin 105 to a bracket 106, which is approximately centered between the sides of each blocker panel 94. (In the exploded view shown in FIG. 4, the aft ends of links 104 are shown disconnected from rackets 106.) A helical coil spring (not shown) is included inside cylinder 115 of each link 104, to provide a biasing force acting in opposition to the telescopic extension of internal shaft 116 from cylinder 115.

Figures 5, 6, 7:
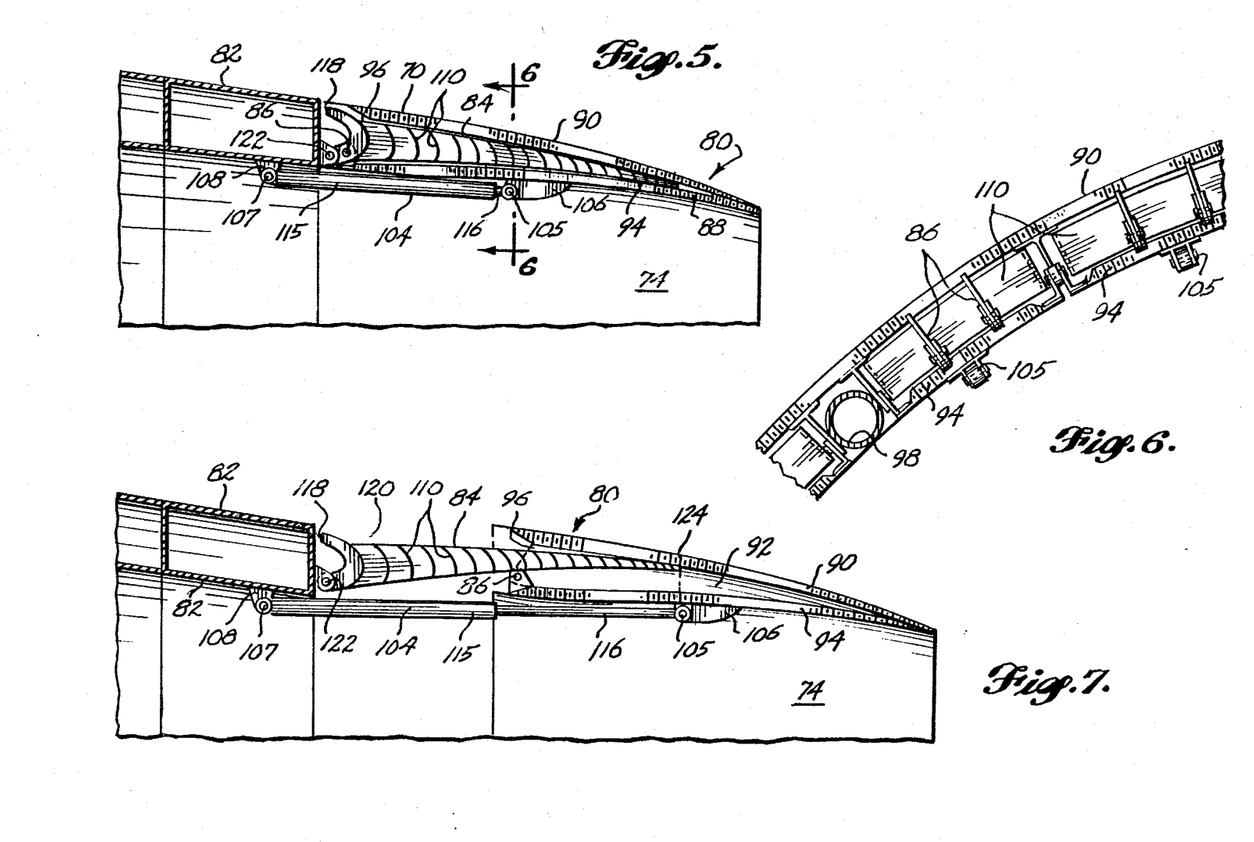
FIG. 5 is a cross-sectional view of the first embodiment of the thrust reverser, wherein the thrust reverser is stowed in a forward thrust mode.
FIG. 6 is a plan view of the inner surface of a portion of the first embodiment.
FIG. 7 is a cross-sectional view similar to FIG. 5, but showing the thrust reverser partially deployed.
Figure 8:
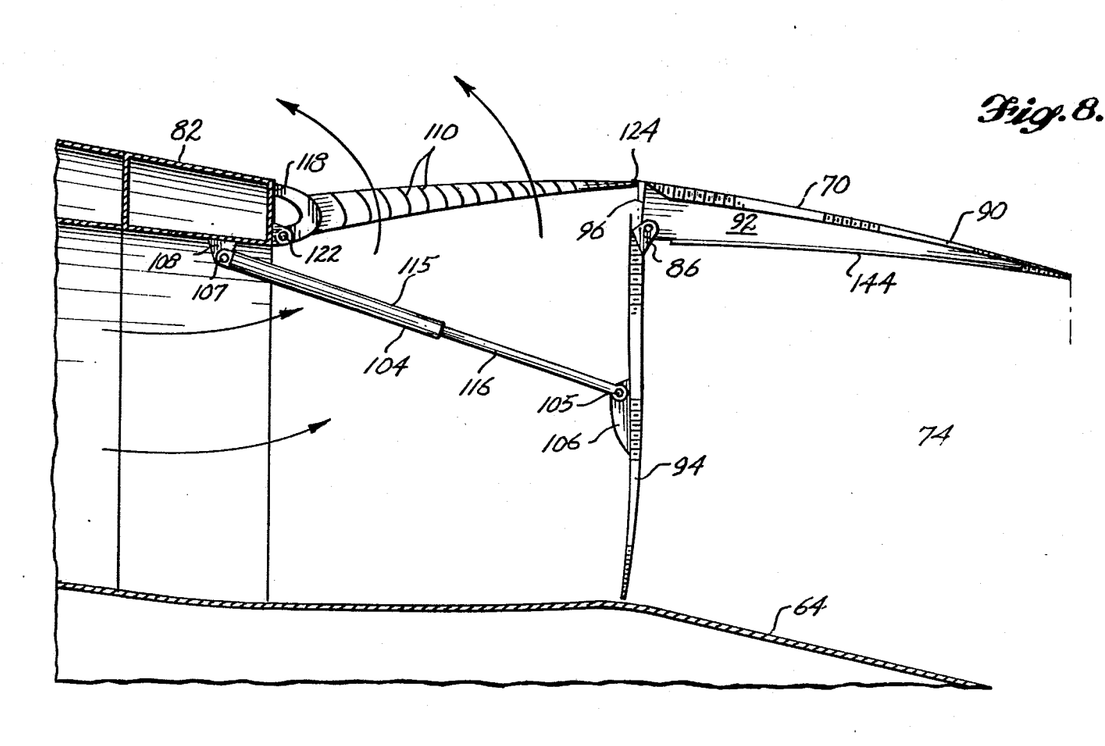
FIG. 8 is a cross-sectional view of a portion of the first embodiment of the thrust reverser showing it fully deployed in the reverse thrust mode.

In FIGS. 5, 7 and 8, deployment of thrust reverser 80 is illustrated with respect to one of the cascaded vane sections 84. The cascaded vane section is shown in FIG. 5 in its stowed position, within pocket 96, i. e., its normal disposition during operation of the engine in forward thrust mode. In this position, cascaded vane section 84 is covered by blocker panel 94, and link 104 lies flat against the inner surface 88 of the aft portion 70 of the nacelle, extending parallel with the direction of airflow through the nacelle and thus producing minimal drag.

In FIG. 7, thrust reverser 80 is shown as partially deployed, linear actuators 98 having translated the aft portion 70 to an intermediate position, rearward of annular ring 82. At this stage in the deployment process, the internal shaft 116 of link 104 is fully extended from cylinder 115. Cascaded vane section 84 is pivoting radially outward about clevis pins 122, its aft end 124 sliding along the internal surface of pocket 96, inside of skin 90. During translation of the aft portion rearwardly, the frictional resistance of the cascaded vane sections sliding along the inner surface of the external skin is generally concentric to the linear actuator load, and therefore prevents or eliminates the twisting and bending of the aft portion of the nacelle that is characteristic of many prior art thrust reverser designs.

While thrust reverser 80 is partially deployed, the majority of bypass airflow continues to flow through nozzle 74; however, a portion of the bypass airflow may pass radially outward through the turning vanes 110, which comprise each cascaded vane section 84. Turning vanes 110 are curved to deflect the airflow radially outward and forward of the engine.

Referring now to FIG. 8, thrust reverser 80 is fully deployed as linear actuators 98 reach the limit of their extension. As the aft portion 70 of the nacelle is translated further toward the rear from the position shown in FIG. 6, each fully extended link 104 begins to pivot about tab 108 and bracket 106, drawing the blocker panels 94 from their stowed position shown in FIGS. 5 and 7, to the position shown in FIG. 8, in which they block substantially all bypass airflow. In moving from their stowed position to their blocking position, blocker panels 94 pivot inwardly about clevis pins 86.

Each cascaded vane section 84 continues to pivot radially outward about clevis pins 122, biased by air pressure built-up as the blocker panels 94 swing into blocking position. An integral stop 118 disposed on the outer forward end of cascaded vane sections 84 contacts the aft surface of annular ring 82, preventing further radial displacement of the cascaded vane section. Once stop 118 contacts the annular ring, each cascaded vane section is cantilevered so that its aft end 124 just clears the forward end of skin 90, at the opening of pocket 96. It is preferable that clevis pins 122 each include a torsion spring or hairpin spring (not shown) to provide a biasing force against the cascaded vane sections, directed radially outward. The biasing force provided by such springs insures that the cascaded vane sections deploy in their cantilevered position during assembly and disassembly, e.g., whenever it is necessary to perform maintenance on thrust reverser 80, when the biasing force of airflow through the duct is unavailable to pivot the cascaded vane sections radially outward.

Because each cascaded vane section 84 is free to pivot about clevis pins 122 as thrust reverser 80 is deployed, aft section 70 can be made relatively thin in radial cross-sectional thickness, creating minimal drag, and because it is thin, is relatively lightweight. The structure and the load bearing characteristics provided by panels 92, skin 90 and triangular shaped filler panels 114 (which are disposed between each of the blocker panels 94) reacts in hoop tension to fan nozzle pressure during operation of engine 60 in forward thrust mode. During operation in reverse thrust mode, the same structure acts in hoop compression relative to a radially directed secondary component of the pressure load on the deployed blocker panels 94.

Since each cascaded vane section 84 is cantilevered from stop 118, its aft end 124 is unlikely to interfere with the forward end of aft portion 70 as the cascaded vane sections are restowed within pockets 96 for operation of the engine in the forward thrust mode. In addition, pockets 96, blocker panel 94 and link 104 combine to provide a very favorable geometry for retraction of thrust reverser 80 under high engine power, should the thrust reverser be inadvertently deployed during cruise conditions.

A further advantage of thrust reverser 80 pertains to the geometry of cascaded vane sections 84 when deployed in the reverse thrust mode. As shown in FIG. 8, each cascaded vane section 84 pivots to extend radially outward defining a conical shape having a larger diameter at the aft end. This diverging conical shape is more efficient in turning airflow in the forward direction, and thus is more effective in providing reverse thrust than any prior art cylindrically shaped annular turning vane section.

Turning now to FIGS. 11 through 14, a second embodiment of the present invention is shown, represented generally by reference numeral 130. Thrust reverser 130 differs in several respects from thrust reverser 80. Specifically, the latter embodiment includes a plurality of nonpivoting cascaded vane sections 132 that are fixedly attached by bolts 144, or other suitable connectors, to the aft end of annular ring 82. Cascaded vane sections 132 are similar to the cascaded vane sections of the first embodiment in that they taper in thickness in the radial direction, from their forward end to their aft end; however, they are relatively shorter in length than those of the first embodiment. As in thrust reverser 80, the cascaded vane sections 132 of thrust reverser 130 are seated in individual pockets 152 defined by radially extending panels 146. Panels 146 are relatively wider than panels 92 of the first embodiment, producing a pocket having a thicker radial cross section. Due to these differences, thrust reverser 130 is impractical for use with an ultrahigh bypass jet engine having a nacelle that converges to an extreme extent along its trailing edge. Nevertheless, it may be used on ultrahigh bypass turbojet engines where the trailing edge of the nacelle converges to an extent that thrust reversers of the prior art design cannot practically be used.

Thrust reverser 130 also differs from thrust reverser 84 in the use of links 138 which are fixed in length (nontelescoping). One end of each link 138 is pivotally connected with a clevis pin 141 to a tab 140, approximately centered between the sides of blocker panel 136, and the other end is pivotally connected with a clevis pin 143 to a bracket 142 suitably attached to the outer surface of engine core 62. A filler panel 148 is disposed between each adjacent blocker panel 138, connected to a trailing panel 154 (see FIG. 14).

Figure 11:
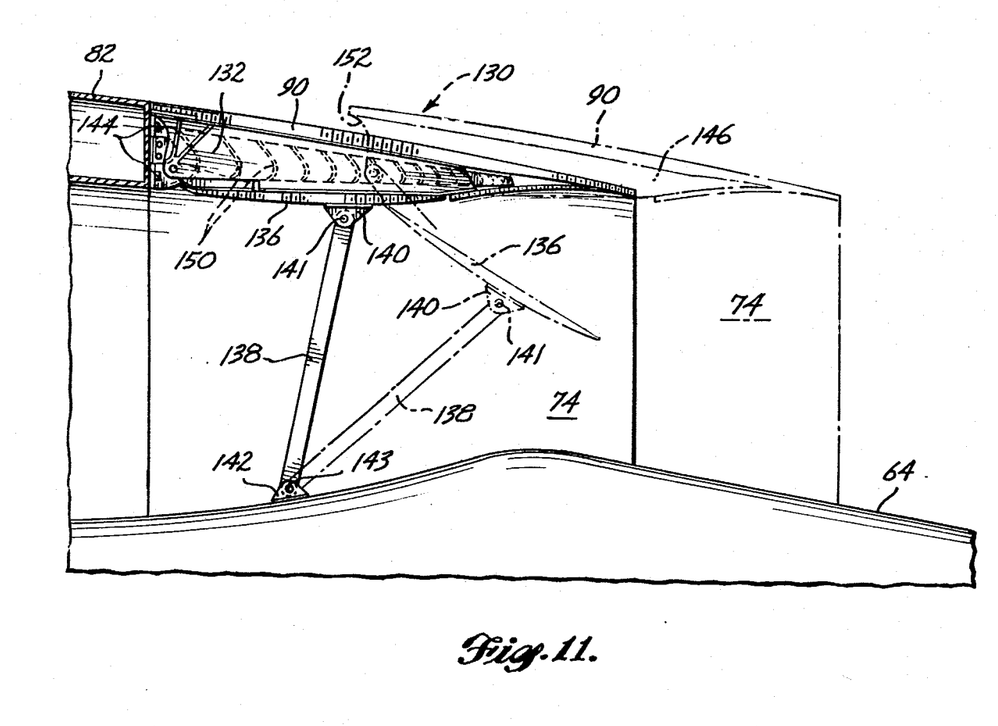
FIG. 11 is a cross-sectional view of a portion of the second embodiment, showing the thrust reverser stowed in a forward thrust mode and in phantom view, showing the thrust reverser partially deployed.

FIG. 11 illustrates the disposition of thrust reverser 130, both in its stowed position while the engine operates in forward thrust mode, and as partially deployed (shown in phantom) in reverse thrust mode. In distinction to the first embodiment, as soon as deployment of thrust reverser 130 begins, each blocker panel 136 is pivoted away from its stowed position, moving into a position where it substantially impedes airflow through nozzle 74 and immediately starts to deflect airflow through the partially exposed turning vanes 150, comprising cascaded vane sections 132.

Figure 12:
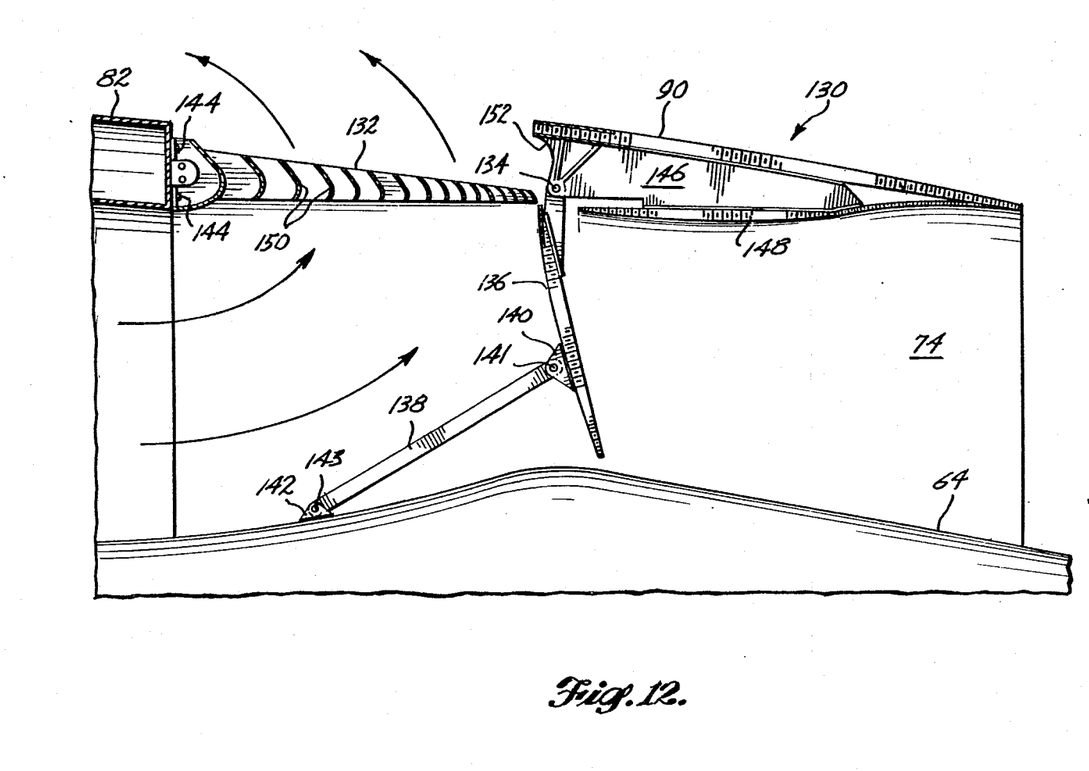
FIG. 12 shows the second embodiment fully deployed in a reverse thrust mode.
Figure 13:
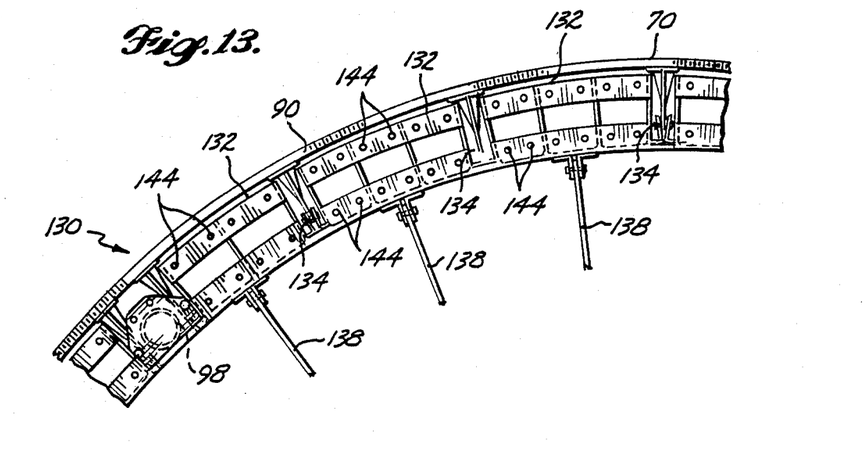
FIG. 13 is an elevational forward end view of a portion of the second embodiment.
Figure 14:
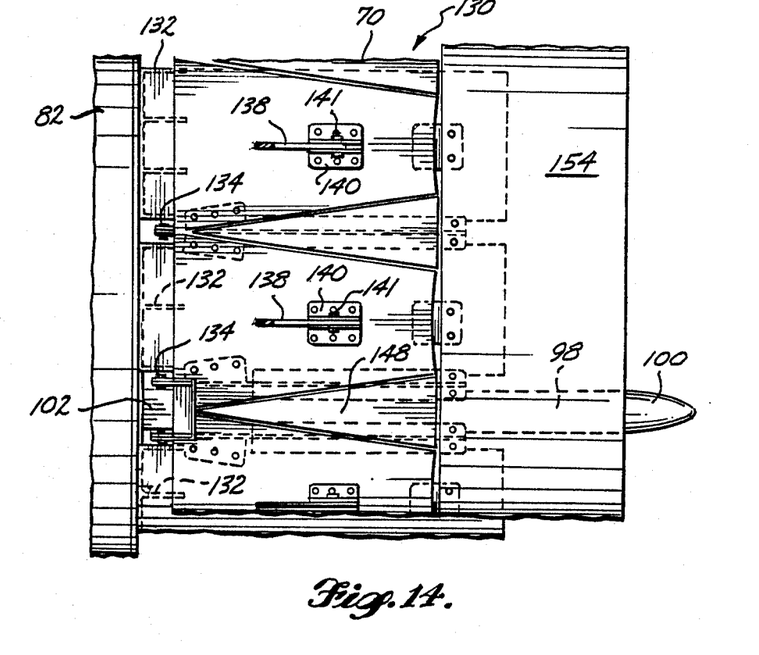
FIG. 14 is a plan view of the inner surface of a portion of the second embodiment of the thrust reverser.

Linear actuators 98 are also used in thrust reverser 130 to translate aft portion 70 rearwardly away from annular ring 82. FIG. 12 illustrates thrust reverser 130 as it is fully deployed in the reverse thrust mode. As shown in this Figure, cascaded vane sections 132 are fully exposed, cantilevered from the aft surface of annular ring 82, and each blocker panel 136 extends downwardly, blocking airflow through nozzle 74. Airflow through the annular duct is thus deflected by turning vanes 150 radially outward and forward.

Thrust reverser 130 is mechanically simpler than thrust reverser 84 and provides many of its benefits with respect to lightweight construction and relatively low drag when stowed in the forward thrust mode. Skin 90, panels 146, and blocking panels 136, i.e., the structure defining pockets 152, provide much the same structural reinforcement in hoop compression and tension as the similar structure in the first embodiment. Although links 138 extend across nozzle 74 when thrust reverser 130 is stowed, they introduce very little drag, since they are formed from relatively thin sheet metal strips with their planar surface aligned in the direction of airflow.

The tapered shape of the cascaded vane sections 132 and their cantilevered support from aft edge of annular ring 82 produces a very streamlined design, which accommodates a moderately convergent cone-shaped nacelle. The structure of individual pockets 152 resulting from the use of panels 146 between each cascaded vane section greatly increases the stiffness and strength of the aft portion 70, without adding substantial mass of material, as would be required in adapting a prior art design thrust reverser to the relatively large diameter nacelle used on an ultrahigh bypass jet engine.

Although the present invention has been disclosed with respect to preferred embodiments, modifications thereto will be apparent to those of ordinary skill in the art within the scope of the claims which follow. Accordingly, the scope of the claims is not to be limited in any respect by the disclosed preferred embodiments.

The embodiments of the invention in which an exclusive property or privilege is claimed are defined as follows:

1. A thrust reverser for a bypass fan jet engine having a core, an annular cowling supported concentrically about at least a portion of the core, an annular duct being defined between the core and the cowling, an aft section of the cowling defining a nozzle for the duct, the aft section including an inner and an outer surface that converge toward a trailing edge, and a fan extending radially beyond the circumference of the core an producing airflow through the duct when driven by the engine, said thrust reverser comprising (a) a plurality of spaced apart, radially extending panels disposed between inner and outer surface of the aft section, defining a plurality of pockets, each pocket be open on its forward end and extending toward the trailing edge;

(b) a plurality of linear actuators connected between a forward fixed portion of the cowling and the aft section of the cowling and operative to translate the aft section rearwardly from a position in which it is adjacent the fixed portion of the cowling in a forward thrust mode, to a displaced position in a reverse thrust mode, creating an opening between the fixed portion and the aft section of the cowling;

(c) a plurality of spaced apart cascaded vane sections attached in cantilever fashion to the fixed portion of the cowling, edges of adjacent cascaded vane sections defining longitudinal slots therebetween, each of said cascaded vane sections extending into one of the pockets disposed in the aft section of the cowling in the forward thrust mode, a plurality of vanes comprising each cascaded vane section being curved to deflect airflow radially outwardly through the opening in a forward direction, when exposed in the reverse thrust mode;

(d) a plurality of blocker panels disposed in spaced apart array around the inner circumference of the aft section of the cowling and pivotally connected at one end to the radially extending panels in the aft section; and (e) a plurality of links, one end of each link being pivotally connected to one of the blocker panels and the other end to one of the fixed section and the core, said links being operative to draw the blocker panels inwardly across the duct as the actuators translate the aft section to its full rearward extension, so that in the reverse thrust mode, airflow is thereby blocked from flowing through the duct nozzle and is instead forced to flow outwardly through the exposed cascaded vane sections.

2. The thrust reverser of claim 1, wherein the links include a first section and a second section, the first section telescopically extending relative to the second section, as the actuators translate the aft section rearwardly until reaching full extension, at which point the links begin to pivot the blocker panels inwardly across the duct.

3. The thrust reverser of claim 2, wherein one of the first and the second sections of each link is pivotally attached to the blocker panel, and the other of said first and said second sections of each link is pivotally attached to a tab disposed on the fixed portion of the cowling.

4. The thrust reverser of claim 2, wherein the links each include spring means for biasing the first and second sections in opposition to their extension.

5. The thrust reverser of claim 1, wherein one end of each link is pivotally connected to one of the blocker panels, and the other end extends across the duct, and is pivotally connected to the outer surface of the core.

6. The thrust reverser of claim 1, wherein the cascaded vane sections are substantially tapered in radial cross-sectional thickness, being relatively thinner on their aft end than on their forward end, the pockets in the aft section of the cowling being similarly tapered.

7. The thrust reverser of claim 1, wherein the cascaded vane sections are each pivotally attached to the fixed portion of the cowling, pivoting outwardly as the actuators translate the aft section of the cowling rearwardly.

8. The thrust reverser of claim 7, wherein the cascaded vane sections include a pivot stop, and wherein airflow in the duct produces a radially directed biasing force, causing the cascaded vane sections to pivot outwardly until reaching the stop, at which point the cascaded vane sections are cantilevered from the fixed portion of the cowling.

9. A thrust reverser for a bypass fan engine having a fan induced airflow through a duct defined by a cowling disposed concentrically about the engine, the thrust reverser comprising:

(a) a plurality of cascaded vane sections, each connected to an aft edge of a fixed portion of the cowling and extending separately and rearwardly therefrom in spaced apart array;

(b) an annular sleeve disposed adjacent the rear of the fixed portion of the cowling in a forward thrust mode, the sleeve extending concentrically about the engine, tapering to a trailing edge and including means for defining a plurality of pockets disposed between an inner and an outer flow surface of the annular sleeve, each pocket having an open end at the forward end of the annular sleeve, and extending rearwardly, converging toward the trailing edge of the sleeve, each pocket sized to receive one of the cascaded vane sections;

(c) actuator means for moving the annular sleeve rearwardly, away from the fixed portion of the cowling, forming an annular opening between the fixed portion of the cowling and the annular sleeve and exposing the cascaded vane sections, said cascaded vane sections thereby extending across the annular opening as said cascaded vane sections are withdrawn from the pockets in the annular sleeve; and (d) a plurality of blocker panels, each disposed against the inner flow surface of the annular sleeve and pivotally connected at one end to the means defining the pockets, the blocker panels including linkage means for pivoting the blocker panels across the duct to deflect airflow through the cascaded vane sections as the actuator means deploy the annular sleeve rearwardly in a reverse thrust mode, the duct airflow being turned by the cascaded vane sections to flow forwardly of the engine, thereby producing a reverse thrust.

10. The thrust reverser of claim 9, wherein the linkage means are extensible between a first length and a second length longer than the first, and are operative to extend to the second length as the annular sleeve is moved rearwardly.

11. The thrust reverser of claim 10, wherein the linkage means include means for biasing the linkage means to one of the first and second lengths.

12. The thrust reverser of claim 9, wherein the linkage means connect the blocker panels to the cowling.

13. The thrust reverser of claim 9, wherein the linkage means connect the blocker panels to an engine shroud.

14. The thrust reverser of claim 9, wherein the means for defining the plurality of pockets include a plurality of radially aligned panels extending between the inner and the outer surface of the annular sleeve.

15. The thrust reverser of claim 9, wherein the cascaded vane sections are pivotally connected to the aft edge of the cowling and pivot outwardly as they withdraw from the pockets while deploying to the reverse thrust mode.

16. The thrust reverser of claim 15, wherein the cascaded vane sections pivot outwardly due to a radially outward directed biasing force caused by airflow in the duct, until reaching a stop at full deployment in the reverse thrust mode.

17. The thrust reverser of claim 9, wherein the outer surface of the annular sleeve substantially converges toward the trailing edge and the pockets disposed within the annular sleeve similarly converge to a smaller diameter at their aft end, the cascaded vane sections being pivotally connected to the aft edge of the fixed portion of the cowling and pivoting radially outward to follow the divergence of the pockets as the cascaded vane sections withdraw therefrom during their deployment in the reverse thrust mode.

18. The thrust reverser of claim 17, further comprising means for biasing the cascaded vane sections radially outward.

19. The thrust reverser of claim 9, wherein the cascaded vane sections are cantilevered from the aft edge of the fixed portion of the cowling.

20. The thrust reverser of claim 9, wherein the cascaded vane sections decrease in radial cross-sectional thickness toward their aft end.

* * * * *